F. W. MEYER.
APPARATUS FOR PRODUCING MODIFIED CURRENTS, ETC.
APPLICATION FILED FEB. 1, 1918.
1,408,118.
Patented Feb. 28, 1922.
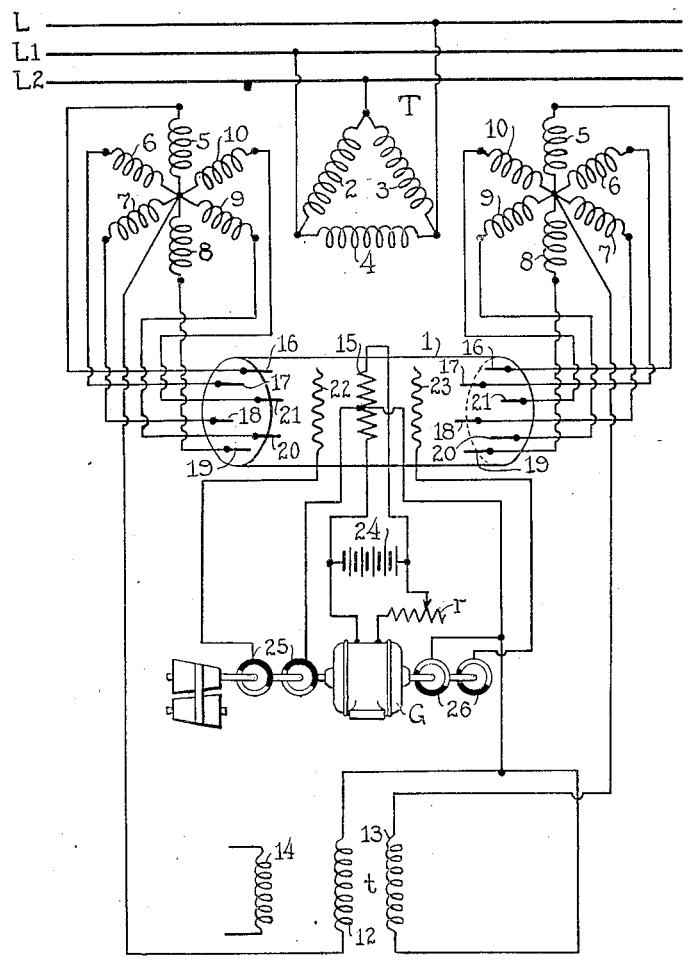
Inventor
Friedrich W. Meyer
By Frank H. Hubbard
Attorney

UNITED STATES PATENT OFFICE.

FRIEDRICH W. MEYER, OF MILWAUKEE, WISCONSIN, ASSIGNOR TO THE CUTLER-HAMMER M'F'G. CO., OF MILWAUKEE, WISCONSIN, A CORPORATION OF WISCONSIN.

APPARATUS FOR PRODUCING MODIFIED CURRENTS, ETC.

1,408,118.  Specification of Letters Patent.  Patented Feb. 28, 1922.

Application filed February 1, 1918. Serial No. 214,908.

*To all whom it may concern:*

Be it know that I, FRIEDRICH W. MEYER, a citizen of the German Empire, residing at Milwaukee, in the county of Milwaukee and State of Wisconsin, have invented new and useful Improvements in Apparatus for Producing Modified Currents, Etc., of which the following is a full, clear, concise, and exact description, reference being had to the accompanying drawing, forming a part of this specification.

This invention relates to apparatus for utilizing an alternating current of a given frequency to produce an alternating current or alternating magnetic flux of a different frequency.

More particularly this invention relates to apparatus for carrying out the method disclosed in my copending application Serial No. 214,907, filed February 1, 1918, of producing from an alternating current by electroionic discharge intermittent pulsatory currents and utilizing such currents to produce an alternating current or magnetic flux of a given frequency irrespective of the frequency of the alternating current source of supply, in which application is claimed generically the apparatus here disclosed.

An object of this invention is to provide simple and efficient apparatus for the purpose set forth wherein the same electroionic means serve to rectify the supplied current and to produce the aforesaid intermittent pulsatory currents.

Another object of the invention is to provide apparatus enabling variation of the frequency of the produced alternating current or alternating magnetic flux without regard to the frequency of the alternating current source of supply.

Other objects and advantages of the invention will hereinafter appear.

The accompanying drawing illustrates the preferred embodiment of the invention and the same will now be described, it being understood that the apparatus shown is susceptible of various modifications.

Referring to the drawing, the same shows a three-phase circuit L, L¹, L², to supply an alternating current of given frequency and apparatus including a transformer T, an electroionic device 1, an alternating current generator G and a transformer $t$ for producing an alternating current of a frequency variable at will. Or if an alternating current is not required the apparatus may be employed to produce merely an alternating magnetic flux and to vary the frequency of such flux.

The transformer T has a primary winding comprising delta connected coils 2, 3, and 4, each of said coils being connected across one phase of the supply circuit. And said transformer has two secondary windings each comprising coils 5, 6, 7, 8, 9 and 10 which are star connected. Thus the transformer T serves to convert the three phase current supplied thereto into six phases.

The transformer $t$, on the other hand, is provided with two primary windings 12 and 13 and a secondary winding 14, said primary windings being supplied with current from the transformer T through the electroionic device 1.

The electroionic device is provided with a cathode 15, duplicate sets of anodes 16, 17, 18, 19, 20 and 21 and two auxiliary anodes or grids 22 and 23 each interposed between one set of anodes and the cathode. The cathode is heated by current from a battery 24 and is connected through the primary winding 12 of transformer $t$ to the star point of the left hand secondary winding of transformer T and through the primary winding 13 of transformer $t$ to the star point of the right hand secondary winding of transformer T. The anodes, on the other hand, are each connected to a corresponding coil of one of the secondary windings of transformer T. More specifically the anodes 16, 17, 18, 19, 20 and 21 of the left hand set are respectively connected to coils 5, 6, 7, 8, 9 and 10 of the left hand transformer winding, while the anodes of the right hand set are correspondingly connected to the coils of the right hand transformer winding. Thus since the device 1 has an inherent rectifying action, as will be understood by those skilled in the art, the currents supplied to the primary windings of transformer $t$ by the secondary windings of the transformer T will be unidirectional. And with the primary windings 12 and 13 of the transformer $t$ respectively connected between the cathode and the left and right hand secondary windings of transformer T as illustrated, the supply of current to winding 12 will be dependent upon an electroionic discharge between the cathode and the left hand set of anodes while the supply of current to winding 13 will be dependent upon an electroionic discharge between the cathode and the right hand set of anodes. Moreover with the cathode connected to the upper terminal of primary winding 12 and to the lower terminal of winding 13, as shown, the currents supplied to said windings will traverse the same in relatively reverse directions.

The generator G supplies a potential to the grids 22 and 23 of the electroionic device and said generator, which is of an alternating current type, is excited by the battery 24 through a resistance $r$ and is provided with two sets of slip rings 25 and 26. The rings of each set are insulated throughout half of the circumference thereof and arranged to supply potentials in half waves displaced by 180°. The rings of the left hand set are respectively connected to the grid 22 and cathode 15 while the rings of the right hand set are respectively connected to the grid 23 and cathode 15.

Thus the generator provides for supplying the grids alternately with potential half waves which are displaced 180° and which may be assumed to be positive. And if it be assumed that support of the grid potentials is necessary to cause discharges between the cathode and sets of anodes, it will be apparent that the grids, under the influence of the generator G, will cause a discharge first between the cathode and one set of anodes and then between the cathode and the other set of anodes, with the result of producing the aforesaid intermittent and pulsatory rectified currents. Also, it will be apparent that these currents being caused to traverse the primary windings of transformer $t$, in opposite directions, will produce component magnetomotive forces of corresponding intermittent pulsatory character and displacement and a resultant alternating magnetic flux. The frequency of the alternating magnetic flux will be the same as the frequency of the rectified currents producing the same and such flux will induce in the primary winding of the transformer an alternating current of like frequency. In this connection, however, it is to be understood that the primary windings 12 and 13 of the transformer might be utilized as the armature windings of a motor, in which event there would be no necessity for the secondary winding of said transformer.

On the other hand, assuming a line potential sufficient to cause discharges between the cathode and two sets of anodes without support of the grid potentials, the grids may be subjected to negative potentials to check the flow of current first between the cathode and one set of anodes and then between the cathode and the other set of anodes, with the same results as those described. And such negative grid potentials may readily be obtained by providing the generator with full slip rings, and including batteries, in circuit with the grids to neutralize the positive potential waves impressed thereon by the generator.

Also, the generator may be provided with full slip rings to impress positive potentials on the grids, batteries being employed to neutralize the negative potential waves or being omitted. However, where an electroionic device of the type illustrated is employed and positive potentials are impressed on the grids, the use of batteries is recommended. Neutralization of the negative potential waves eliminates any possible effect of either grid upon the discharge controlled by the other grid and experiments have demonstrated that a device such as illustrated will pass larger currents when batteries are so employed.

As above pointed out, the frequency of the produced alternating magnetic flux or alternating current is the same as the frequency of the intermittent pulsatory currents supplied by the electroionic device and hence since the frequency of the latter currents is determined by the generator G, it is obvious that the frequency of the produced alternating magnetic flux or alternating magnetic current may be varied at will by varying the speed of the generator G.

What I claim as new and desire to secure by Letters Patent is:

1. In apparatus for producing an alternating magnetic flux or alternating current of a given frequency from a source of alternating current of a different frequency, in combination, common means, including electroionic means and electrostatic means to influence the operation thereof to both rectify the supplied current and produce therefrom intermittent pulsatory currents of said given frequency and of a given displacement and means for producing by such intermittent pulsatory currents component magnetomotive forces.

2. In apparatus for producing an alternating magnetic flux or alternating current of a given frequency from a source of alternating current of a different frequency, in combination, common means, including electroionic means and electrostatic means to influence the operation thereof to both rectify the supplied current and produce therefrom intermittent pulsatory currents of said given frequency and of a given displacement and means for producing by such intermittent pulsatory currents an alternating magnetic flux and inductively creating an alternating current by such magnetic flux.

3. In apparatus for producing an alternating magnetic flux or alternating current of a given frequency from a source of alternating current of a different frequency, in combination, a phase varying transformer to be supplied from such source, electroionic means supplied by said transformer, electrostatic means influencing the action of said electroionic means for causing the latter to function to both rectify the supplied current and to produce therefrom intermittent pulsatory currents of said given frequency and displaced a given number of degrees and means for producing from such intermittent pulsatory currents component magnetomotive forces.

4. In combination, a source of alternating current of a given frequency, electroionic rectifying means supplied with current from said source, electrostatic means influencing said electroionic means to cause the same to produce rectified currents of an intermittent pulsatory character displaced by a given number of degrees and of a variable frequency determinable by the second mentioned means and means for producing an alternating magnetic flux by said intermittent pulsatory currents.

5. In combination, a source of alternating current of a given frequency, a phase varying transformer supplied by said source, electroionic rectifying means supplied by said transformer, electrostatic means influencing said electroionic means to cause the same to produce rectified currents of an intermittent pulsatory character, means to time the operation of said electrostatic means for effecting relative displacement of said pulsatory rectified currents by a given number of degrees, the second mentioned means further providing for variation of the frequency of pulsation of said rectified currents and means for producing by such rectified currents an alternating magnetic flux of a like frequency.

6. In combination, a source of alternating current, an electroionic rectifying device supplied with current therefrom, said device having a plurality of anodes and a common cathode for the production of independent rectified currents and further having a grid for control of each of such currents and means for impressing potentials on said grids intermittently to render the currents supplied by said electroionic device of an intermittent pulsatory character and to displace such currents by a given number of degrees.

7. In combination, a source of alternating current of given frequency, an electroionic rectifying device supplied with current from said source, said device having anodes and a common cathode to produce independent rectified currents and further having a grid for controlling each of such currents, means for intermittently impressing potentials upon said grids selectively to render the rectified currents of an intermittent pulsatory character and of a frequency determinable thereby and means for producing by such intermittent pulsatory currents an alternating magnetic flux of a corresponding frequency.

8. In combination, a source of alternating current of a given frequency, a phase varying transformer supplied thereby and having a plurality of secondary windings, an electroionic rectifying device having a plurality of sets of anodes, the anodes of each set being connected to the coils of one of said secondary transformer windings, and a common cathode for said anodes having connections with both of said transformer windings, said device further having a plurality of grids one being interposed between each set of anodes and said cathode, means for impressing potentials upon said grids to cause said device to produce intermittent pulsatory currents displaced by a given number of degrees and of a frequency variable by said means and means supplied with said currents for producing an alternating magnetic flux of a corresponding frequency.

In witness whereof, I have hereunto subscribed my name.

FRIEDRICH W. MEYER.